(12) United States Patent
Halbedel et al.

(10) Patent No.: US 8,397,057 B2
(45) Date of Patent: Mar. 12, 2013

(54) GENERIC HUB TO INCREASE SECURITY WHEN ACCESSING BUSINESS SYSTEMS

(75) Inventors: Ralf Halbedel, Heidelberg (DE); Marko Degenkolb, Wiesloch (DE)

(73) Assignee: SAP AG, Walldorf (DE)

( * ) Notice: Subject to any disclaimer, the term of this patent is extended or adjusted under 35 U.S.C. 154(b) by 1121 days.

(21) Appl. No.: 11/838,134

(22) Filed: Aug. 13, 2007

(65) Prior Publication Data

US 2009/0049539 A1 Feb. 19, 2009

(51) Int. Cl.
*H04L 29/06* (2006.01)
(52) U.S. Cl. .......................................... 713/154
(58) Field of Classification Search ................. 726/1, 4, 726/5, 6; 713/155
See application file for complete search history.

(56) References Cited

U.S. PATENT DOCUMENTS

| 5,467,350 | A | * | 11/1995 | Price et al. | 370/467 |
| 2004/0088409 | A1 | * | 5/2004 | Braemer et al. | 709/225 |
| 2006/0253495 | A1 | * | 11/2006 | Png | 707/200 |

* cited by examiner

*Primary Examiner* — Michael S McNally
*Assistant Examiner* — Daniel Hoang
(74) *Attorney, Agent, or Firm* — Kenyon & Kenyon LLP

(57) ABSTRACT

In a method and system for increasing security when accessing a business system, a generic hub receives a request having a first transfer protocol from a user to access an application or application data maintained in an application server. In response to the user request, the generic hub verifies the authorization of the user to access the application server. If the user is authorized, a user interface to the application is presented to the user and input data is received from the user interface. The input data is checked for validity based on application-specific metadata and type checks bound to this metadata associated with fields in the user interface, and any extraneous or non-expected data is removed from the input data. The input data and user request of a first transfer protocol are tunneled to the application using a second transfer protocol.

21 Claims, 4 Drawing Sheets

GENERIC HUB TO INCREASE SECURITY WHEN ACCESSING BUSINESS SYSTEMS

BACKGROUND

Certain business systems permit users to access applications and application data stored in an application server over a web-based interface. Generally, such access to web-based applications, written using standard UI technologies such as, e.g., JavaServer Pages ("JSP"), Business Server Pages ("BSP"), or Web Dynpro, occurs via HTTP-based protocols. A drawback to using open web standardized protocols such as HTTP or HTTPS is that publicly known bugs in the implementation of these protocols can allow non-authorized entities to infiltrate the business systems and corrupt or steal the data.

Therefore, it would be desirable to have a method and system for providing a secure connection for users using web-based applications to access an application server.

DETAILED DESCRIPTION

Embodiments of the present invention provide a method and system for increasing security when accessing a business system. A generic hub may receive a request having a first transfer protocol from a user to access an application or application data maintained in an application server. In response to the user request, the generic hub may verify the authorization of the user to access the application server. If the user is authorized, a user interface to the application may be presented to the user and input data may be received from the user interface. The input data may be checked for validity, and any extraneous or non-expected data may be removed from the input data before it is transferred to the backend system. The input data and user request of a first transfer protocol may be tunneled to the application server by generically switching to a second transfer protocol.

Figure 1:
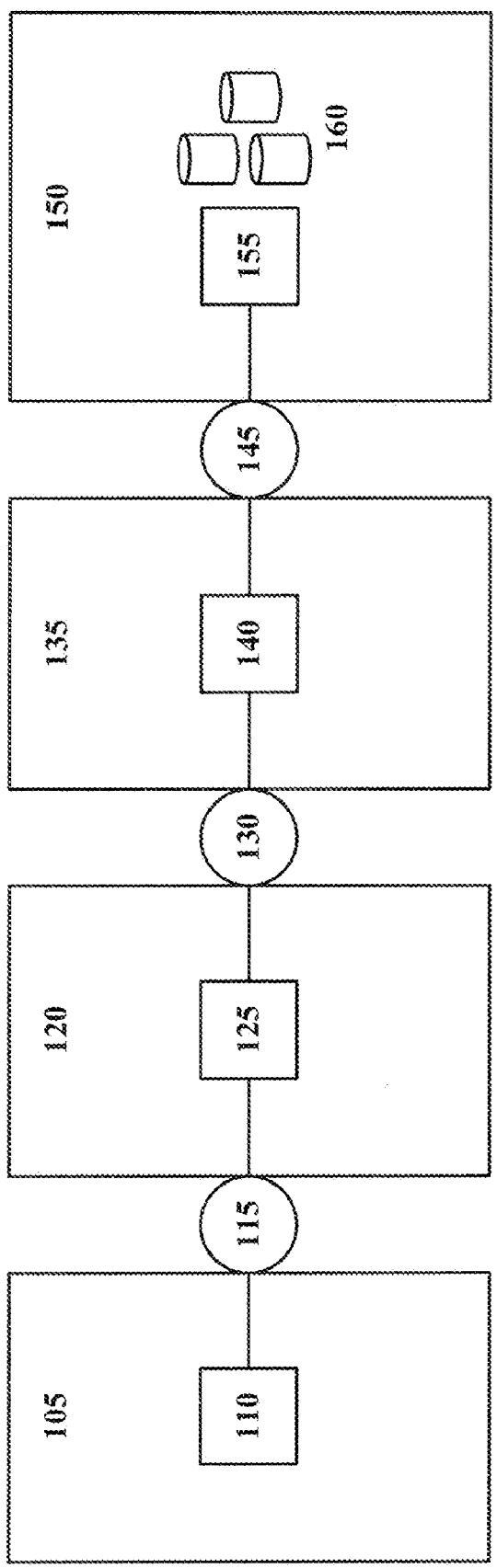
FIG. 1 is a block diagram illustrating a system for accessing an application server.

FIG. 1 is a block diagram illustrating a system for accessing an application server. For security reasons, the system may be divided into a set of zones. In one embodiment, each zone may be deployed on different systems, with each zone separated from other zones by a firewall. An end user 110 may reside in a first zone 105. The end user may access a company zone 120 through the Internet. The company zone 120 may be operated by an application gateway 125 and protected by a first firewall 115. Generally, authentication of the end user 110 may be required for the end user to gain access to the company zone 120. Once the user 110 has accessed the company zone 120, the user may start business applications for purposes including but not limited to collaboration scenarios. A server may store these business applications, including business logic, and user interfaces with which a user may access the server. The server, in one embodiment, may be an application server. The server may be divided into a separately deployable presentation server 140 in a frontend zone 135 and a backend server 155 having a set of business applications, databases and storage devices 160 in a backend zone 150, with a firewall 145 separating the presentation server 140 from the backend server 155. Upon accessing the company zone 120 and starting business applications, the presentation server 140 may provide a user interface for the user 110 to access the backend zone 150. To access the backend server 155 containing business data and business logic associated with the business applications, the user 110 may be required to be further authenticated. Additional authentication may enable the user 110 to access the backend system 155 through the firewall 145, while preventing unauthorized users from intruding in a company system and having access to backend data.

While the system may improve the security of a business system, dividing a server into separately deployable complete presentation 140 and backend servers 155 may be costly and inefficient. In order for the presentation server 140 to properly interact with the backend server 155, a complete presentation server 140 may need to have knowledge of the metadata of an application as well as remain in synchronization with the backend server 155 with regards to application versions. As the presentation server 140 may require knowledge of application metadata, user interfaces provided to the end user by the presentation server 140 may be created by application-specific coding. The user 110 thus may only have access to applications for which the presentation server 140 has application metadata and other application-specific coding.

Figure 2:
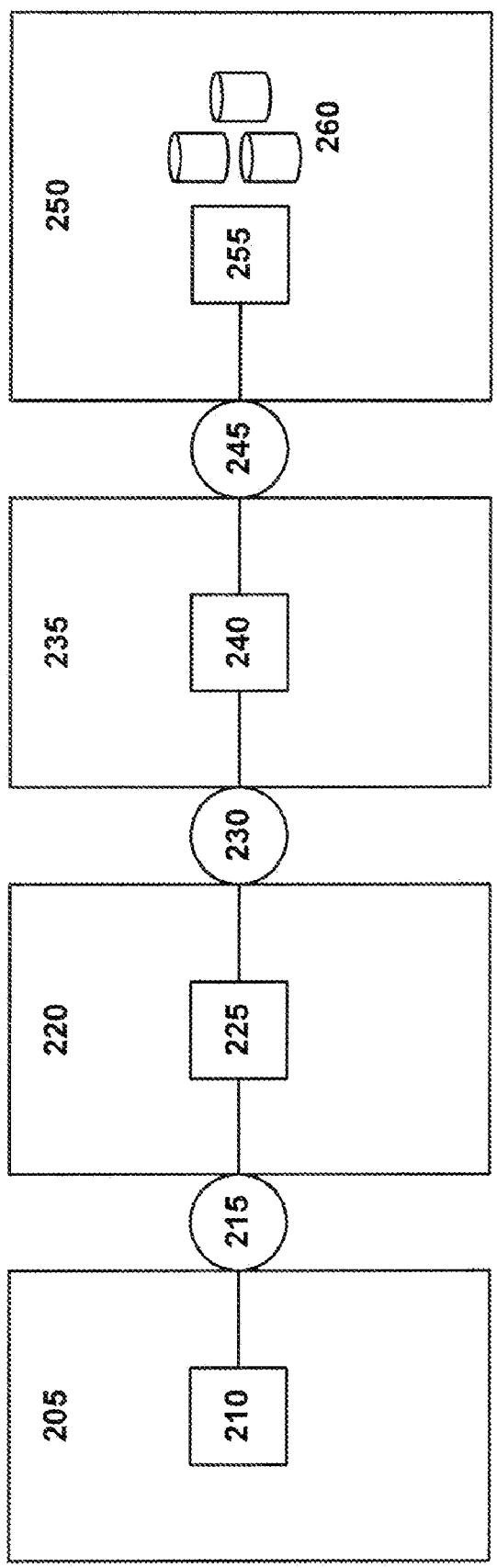
FIG. 2 is a block diagram illustrating a system for accessing an application server.

FIG. 2 is a block diagram illustrating a system for accessing an application server. The system may be divided into a set of zones for security purposes. An end user 210 residing in a first zone 205 may access a separately deployed company zone 220, operated by an application gateway or other device 225. The device operating the company zone 220 is immaterial for purposes of this invention, and various devices may be used in place of an application gateway. The first zone 205 and the company zone 220 may be separated by a first firewall 215. Instead of dividing a server, such as an application server, into a presentation server and a backend server, a generic hub 240 may be employed in place of the presentation server. The generic hub 240 may not need any application-specific implementation on this server. The lack of a need for application-specific coding may enable the generic hub 240 to generically perform all security-relevant actions regardless of the application requested to be executed. Thus, no application specific code has to be developed specifically on this generic hub, thereby reducing development and test efforts significantly. The security actions may include authorization checks, type checks, and tunneling of the protocol. If a user 210 is authenticated by the generic hub 240, the user 210 may access the backend server 255 to operate on the business data and business logic 260 stored therein.

The generic hub 240 may be configured to perform security-relevant actions. One security action may be an authorization check, in which a security check is performed on a user requesting execution of an application at the generic hub 240. In one embodiment, an access control list may be used to authorize a user 210. The access control list may be a data file stored in the hub 240 that maintains a list of users and their respective authorization to access a particular application server, and within the particular application server, particular applications. One embodiment for determining whether a user 210 may be authorized is to employ a username and password. Alternatively, the access control list may store and compare a user's IP address to determine authorization. In one embodiment, a combination of username and password and the IP address of the user may be employed. In one embodiment, if security is a priority, such as in the banking industry, the access control list may be stored in the backend server 255. When a user seeks to access the backend server 255, the generic hub 240 may notify the backend server 255 that security information needs to be read and compared to the access control list. The backend server 255 may retrieve the user information and determine whether the user should be granted access to an application. If a user fails the authorization check, an error message may be generated and the user may be denied access to the requested application.

The generic hub 240 may perform type checks, or input validation, on data input by a user 210 through a user interface to an application. Input validation may be performed on a field level. In rendering the user interface for an application, the generic hub 240 may know what fields are being created and what data to expect in such fields. The generic hub 240 may have such knowledge through metadata exposed by the backend server's data dictionary. The data dictionary may store various data types and corresponding field lengths for each data type. After the user interface is rendered, user data input into the fields of the user interface may be checked with expected data values. For instance, if a field is a date field, the generic hub 240 may expect an eight-character string corresponding to a month, date, and year. If the user 210 attempts to enter more than eight characters, the generic hub 240 may recognize that such an entry is invalid. As the hub 240 knows how many characters to expect, the hub 240 may discard the extraneous characters prior to transmitting the user data to the backend server 255. In this respect, the generic hub 240 may prevent code intrusions from occurring, in which a system command or buffer overrun, potentially causing an exploitation of the HTTP protocol, is entered along with expected data. It is also possible, that the meta-data exposed by the backend server 255 may include application-specific checks, which have been developed on the backend server 255 and are generically executed on the generic hub 240.

The generic hub 240 also may perform a protocol switch. Generally, user requests to access a backend system are HTTP-based requests. As HTTP is a known protocol, various bugs or exploits may exist for compromising HTTP-based requests. To implement an additional security feature, the generic hub 240 may receive a user's HTTP-based request. The generic hub 240 may tunnel the HTTP request to the application or backend server 255 using a trusted proprietary protocol. In one embodiment, this proprietary protocol may be Remote Function Call (RFC). However, other protocols may be used, such as SOAP and Remote Procedure Call (RPC). The choice of protocol to use is unimportant so long as a different protocol is used to tunnel the user request. By tunneling the HTTP or HTTPS request to the application server 255, the hub 240 may safeguard the user request from potential exploitation, as known exploitations against HTTP-based requests may not succeed with a different protocol in place.

Figure 3:
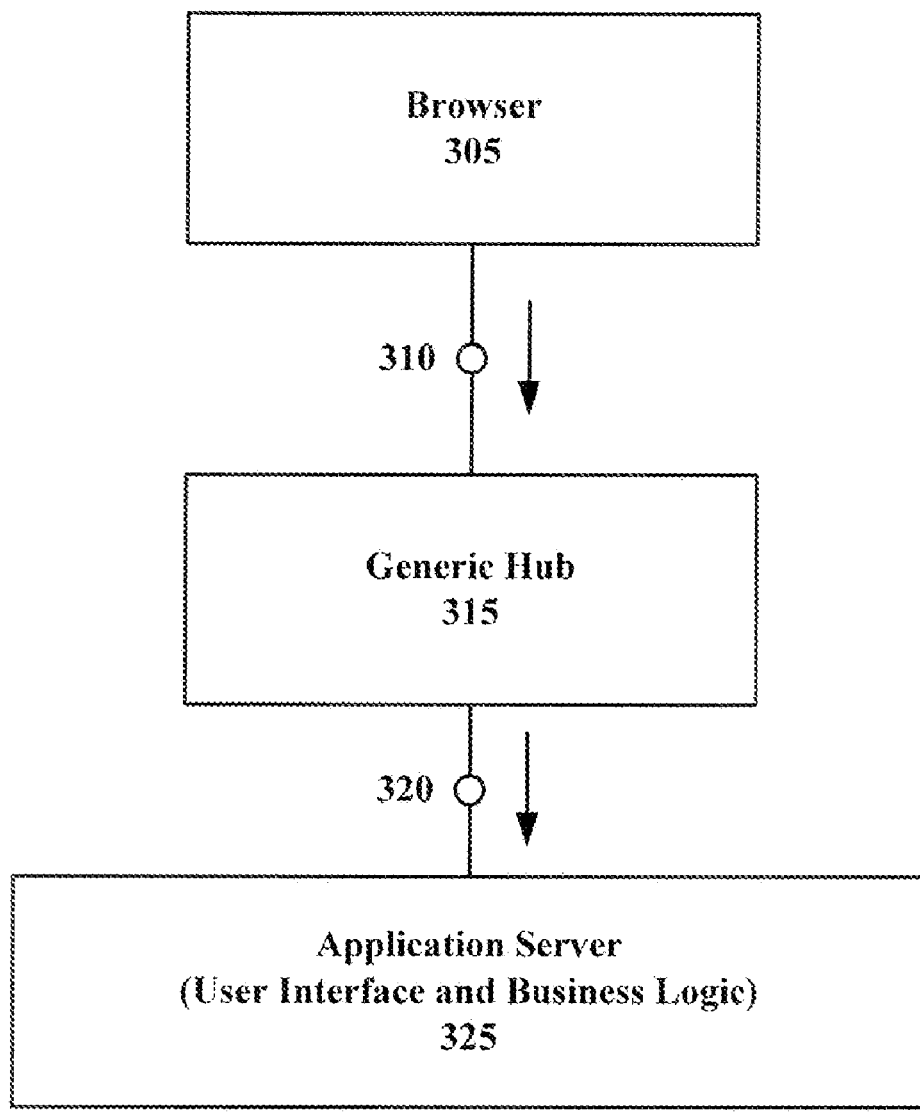
FIG. 3 is a block diagram illustrating an embodiment for transmitting access requests to an application server.

FIG. 3 is a block diagram illustrating an embodiment for transmitting access requests to an application server. A user, through a user interface displayed in a browser 305, may transmit a request 310 to access a particular application or data related to a particular application residing in a backend server, such as an application server. This request may take the form of a HTTP or HTTPS request. A generic hub 315 may receive the user request. After performing security checks to ensure the user is authorized to access the backend server, and that the data to be transmitted to the backend server conforms to expected data values, the hub 315 may tunnel the user's request to the application server using a different protocol. In one embodiment, the hub may encapsulate the user's HTTP-based request in a second protocol, and transmit the encapsulated request (seen generally as element 320) to the application server 325. In one embodiment, the hub 315 may extract the data contained in the user's HTTP-based request and create and enter the extracted data into a request conforming to a different protocol. By tunneling the user's original request, using either of the embodiments described above, the hub 315 may shield the user's request from potential exploitation, thereby offering another layer of security to ensure data and applications maintained in the backend server are not infiltrated.

Figure 4:
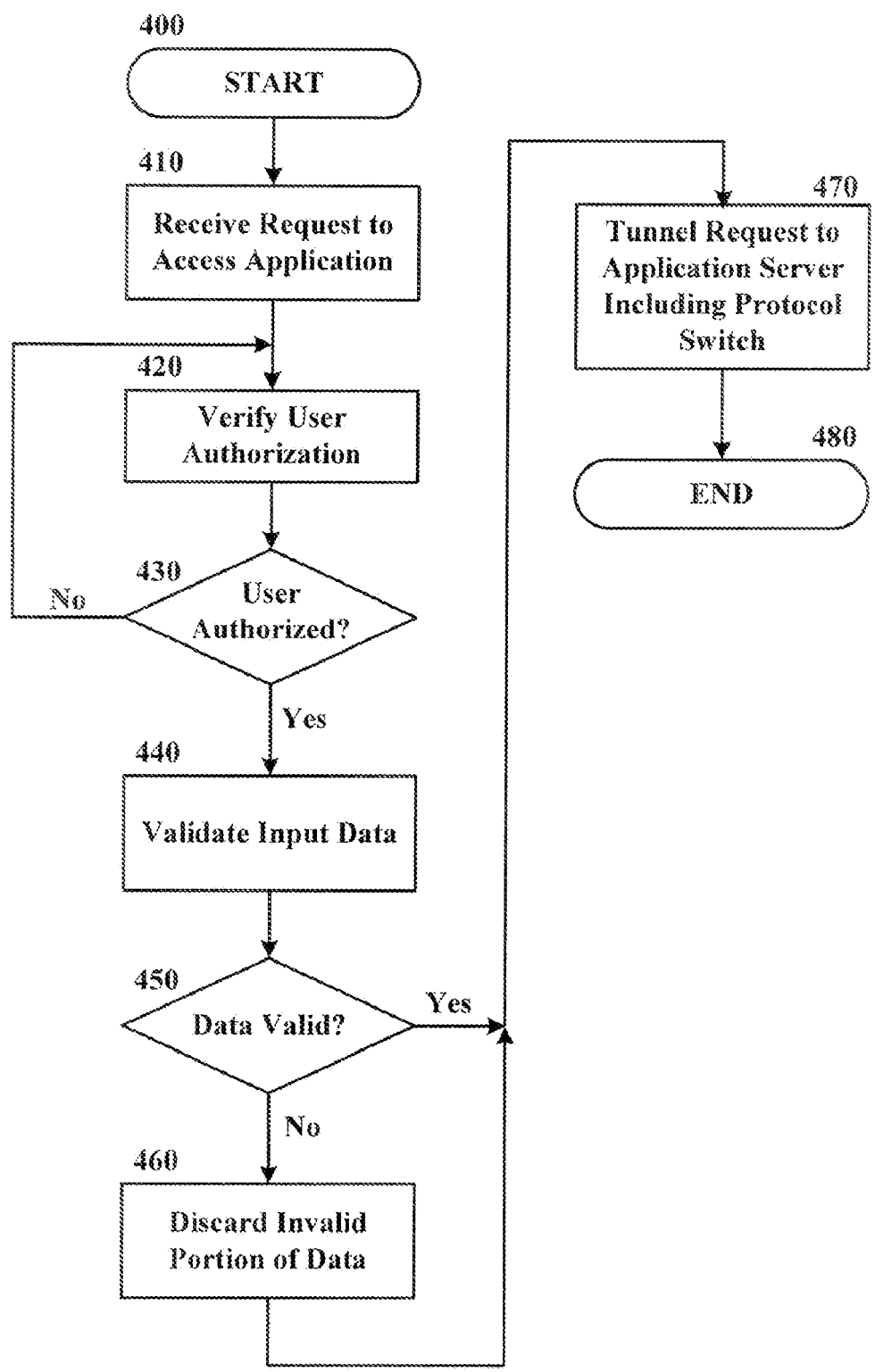
FIG. 4 is a flowchart illustrating an embodiment for securely accessing an application server.

FIG. 4 is a flowchart illustrating an embodiment for securely accessing an application server. In block 410, a generic hub may receive a request from a user to access an application or data stored in a backend server, such as an application server. The request may conform to a first transfer protocol, such as HTTP or HTTPS. In response to this request, in block 420, the hub may authenticate the user. The authentication may include the user entering a username and a password. The entered username and password may be compared to an access control list storing a set of approved usernames and passwords for a particular application server and a particular application residing in the server. Alternatively, the access control list may include a set of valid IP addresses from which the application server and applications residing in the server may be accessed. The hub may compare the user's IP address to the approved IP addresses to determine whether to grant the user access. In one embodiment, the IP address and username and password entered by the user may be verified such that only a user entering a correct username and password and operating on a computer having an approved IP address may be authorized. In decision block 430, if the user is authorized, the user may be access a user interface to the application sought to be executed. If the user is not authorized, the user may be prompted to entered in another username or password. In block 440, the hub may receive and validate user data input to various fields present in the user interface for a particular application. This input data may be validated by the hub to ensure that data present in each field conforms to expected data. In decision block 450, if the data is invalid, in block 460, extraneous data not conforming to expected data values may be discarded or truncated from the input data. Discarding extraneous data may prevent a user from attempting to corrupt or infiltrate data maintained in the backend server, as the extraneous data may take the form of a system command or buffer overrun. If the data is valid, in block 470, the hub may switch the transfer protocol employed, and may tunnel the input data having a first transfer protocol using a second transfer protocol. While the first and second transfer protocols may be any transfer protocol conventionally known, the first and second transfer protocols may be different to prevent an infiltrator from having knowledge of how to exploit the protocols. As the switch to the second protocol is purely a company-specific configuration, an infiltrator may not even know the protocol has been switched and/or what type of protocol is actually used as second protocol; the infiltrator would attempt to access the system via the user interface using the first protocol. The second protocol may include but is not limited to Remote Function Call (RFC), Remote Procedure Call (RPC), and SOAP. Tunneling the user request of the first transfer protocol may be achieved by encapsulating the first transfer protocol request in a second transfer protocol request, such that the request from the hub to the application server appears to outsiders to be a request of the second transfer protocol. Alternatively, tunneling may be achieved by extracting data from the request of the first transfer protocol and inserting the extracted data into a request of a second transfer protocol. The process ends in block 480.

Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. A method of accessing an application server, the method comprising:
   at an application-independent generic hub, receiving a request from an external system to access application data stored in the application server, the request conforming to a first transfer protocol;
   responsive to said receiving, verifying authorization of the external system to access the application server;
   deriving, for input data in a data field of a user interface, an expected data type and a corresponding field length for the data field from metadata provided by a backend server's data dictionary;
   if the external system is authorized, validating the input data by:
     determining data type and field length of the input data,
     comparing the determined data type and field length to the expected data type and corresponding field length, and
     discarding extraneous data from the input data when the field length of the input data exceeds the corresponding field length, wherein the extraneous data comprises data characters that are in excess of the corresponding field length; and
   responsive to said validating, tunneling the request of the first transfer protocol in a second transfer protocol to the application server, wherein the request includes the input data.

2. The method of claim 1, wherein the expected data type and corresponding field length are field-dependent.

3. The method of claim 1, wherein the first transfer protocol and the second transfer protocol are different transfer protocols.

4. The method of claim 3, wherein the first transfer protocol is selected from the group consisting of HTTP, HTTPS, SOAP, and Remote Function Call (RFC).

5. The method of claim 3, wherein the second transfer protocol is selected from the group consisting of Remote Procedure Call (RPC), Remote Function Call (RFC), and SOAP.

6. The method of claim 1, wherein said tunneling comprises extracting request data from the external system request and transferring the request data using the second transfer protocol.

7. The method of claim 1, wherein said tunneling comprises encapsulating the external system request conforming to the first transfer protocol in the second transfer protocol, the external system request including the input data.

8. A non-transitory computer-readable storage medium containing a set of instructions, the set of instructions capable of causing a computer to implement a method comprising:
   at an application-independent generic hub, receiving a request from an external system to access application data stored in the application server, the request conforming to a first transfer protocol;
   responsive to said receiving, verifying authorization of the external system to access the application server;
   deriving, for input data in a data field of a user interface, an expected data type and a corresponding field length for the data field from metadata provided by a backend server's data dictionary;
   if the external system is authorized, validating the input data by:
     determining data type and field length of the input data,
     comparing the determined data type and field length to the expected data type and corresponding field length, and
     discarding extraneous data from the input data when the field length of the input data exceeds the corresponding field length, wherein the extraneous data comprises data characters that are in excess of the corresponding field length; and
   responsive to said validating, tunneling the request of the first transfer protocol in a second transfer protocol to the application server, wherein the request includes the input data.

9. The computer-readable storage medium of claim 8, wherein the expected data type and corresponding field length are field-dependent.

10. The computer-readable storage medium of claim 8, wherein the first transfer protocol and the second transfer protocol are different transfer protocols.

11. The computer-readable storage medium of claim 10, wherein the first transfer protocol is selected from the group consisting of HTTP, HTTPS, SOAP, and Remote Function Call (RFC).

12. The computer-readable storage medium of claim 10, wherein the second transfer protocol is selected from the group consisting of Remote Procedure Call (RPC), Remote Function Call (RFC), and SOAP.

13. The computer-readable storage medium of claim 8, wherein said tunneling comprises extracting request data from the external system request and transferring the request data using the second transfer protocol.

14. The computer-readable storage medium of claim 8, wherein said tunneling comprises encapsulating the external system request conforming to the first transfer protocol in the second transfer protocol, the external system request including the input data.

15. A distributed architecture system, comprising:
   a generic hub, configured to connect to an application server, comprising a processing unit and a memory unit, coupled to the processing unit, storing instructions adapted to be executed by the processing unit to
   at an application-independent generic hub, receive a request from an external system to access application data stored in the application server, the request conforming to a first transfer protocol;
   responsive to said receiving, verify authorization of the external system to access the application server;
   derive, for input data in a data field of a user interface, an expected data type and a corresponding field length for the data field from metadata provided by a backend server's data dictionary;
   if the external system is authorized, validate the input data by:
     determining data type and field length of the input data;
     comparing the determined data type and field length to the expected data type and corresponding field length; and
   discarding extraneous data from the input data when the field length of the input data the corresponding field length, wherein the extraneous data comprises data characters that are in excess of the corresponding field length; and responsive to said validating, tunnel the request of the first transfer protocol in a second transfer protocol to the application server, wherein the request includes the input data.

16. The distributed architecture system of claim 15, wherein the expected data type and corresponding field length are field-dependent.

17. The distributed architecture system of claim 15, wherein the first transfer protocol and the second transfer protocol are different transfer protocols.

18. The distributed architecture system of claim 17, wherein the first transfer protocol is selected from the group consisting of HTTP, HTTPS, SOAP, and Remote Function Call (RFC).

19. The distributed architecture system of claim 17, wherein the second transfer protocol is selected from the group consisting of Remote Procedure Call (RPC), Remote Function Call (RFC), and SOAP.

20. The distributed architecture system of claim 15, wherein said tunneling comprises extracting request data from the external system request and transferring the request data using the second transfer protocol.

21. The distributed architecture system of claim 15, wherein said tunneling comprises encapsulating the external system request conforming to the first transfer protocol in the second transfer protocol, the external system request including the input data.

* * * * *